United States Patent Office 3,311,603
Patented Mar. 28, 1967

3,311,603
POLYMERIZATION PROCESS IN THE PRESENCE OF A ZIEGLER CATALYST WATER AND AN AMINE
Harry A. Cheney, Berkeley, Calif., assignor to Shell Oil Company, New York, N.Y., a corporation of Delaware
No Drawing. Filed Sept. 16, 1963, Ser. No. 309,296
6 Claims. (Cl. 260—93.7)

This invention relates to the polymerization of alpha-olefins to produce highly stereoregular polymers. More particularly, it relates to an improved process for controlling the polymerization of propylene.

It is known that alpha-monoolefins can be polymerized at relatively low temperatures and pressures to produce polymers which are linear and, in the case of propylene and higher olefins, highly stereoregular in structure. A substantial body of art in this field is summarized in the book "Linear and Stereoregular Addition Polymers" by Gaylord et al., Interscience Publishers, Inc., New York, 1959, and in recent literature and patents. The methods for carrying out such polymerizations are generally referred to as "low pressure" methods. Known effective catalysts for these polymerizations are species or modifications of so-called Ziegler catalysts. Broadly, stereoregulating catalysts are two-component systems comprising a compound of the left-hand subgroups of Groups IV–VI or Group VIII of the Mendeleev Periodic Table and a Group I–III element or alloy or hydride or organic derivative having an organometallic bond. Combinations of certain selected compounds of the two types are particularly adapted for the production of stereoregular polymers of propylene which are characterized by extremely high crystallizability.

"Crystallizable" polymers are those which have a molecular arrangement that enables them to solidify from a melt in a highly crystalline structure. The general practice in the art is to refer to "crystalline" or "crystallizable" polymer, rather than "partially crystalline" or "partially crystallizable" polymer, even though substantially less than 100%, e.g., as little as 50%, of the polymer is crystalline or crystallizable. A crystallinity of 70%, as determined by X-ray analysis or similar methods, is extremely high for stereoregular polypropylene. In general, polypropylene having a crystallizability of this order contains at most only a small proportion of material which is extractable in hydrocarbons, such as paraffins of $C_5$ to gasoline boiling range. Typically, the proportion of highly crystalline polypropylene which is extractable in isopentane, heptane, or isooctane is less than 10% and it can be less than 5%. The hydrocarbon soluble portion of such polymers is generally completely atactic material, i.e., is not stereoregular. It may also have a lower molecular weight than the hydrocarbon insoluble portion.

Some of the outstanding advantages of polypropylene are directly associated with its degree of crystallinity, which, in turn, is a function of stereoregularity as well as crystallization conditions. Properties directly associated with crystallinity are tensile strength and hardness. The present invention is directed to a process for production of polypropylene and similar polymers having a controlled, high stereoregularity and crystallizability.

Unless otherwise stated, the terms crystallinity and crystallizability herein refer to these properties as indicated by the percentage of polymer insoluble in isopentane at room temperature. Percentage insoluble in isopentane is calculated as 100 minus "isopentane solubles," which is determined as follows:

A 25 g. sample of powdered polymer is placed in a 500-ml. glass-stoppered flask. After addition of 200 ml. of isopentane, the flask is shaken periodically for 10 minutes at 70° F., and the contents are filtered. Two additional 100-ml. portions of isopentane are used to rinse the flask twice and twice reslurry the filter cake. The filtrate is evaporated on a steam bath, and the residue from the evaporation is taken as "isopentane solubles."

The viscosity average molecular weight of normally solid, crystalline polypropylene usually is at least about 40,000 and is generally between 100,000 and 1,200,000. For convenience the molecular weight is usually expressed in terms of intrinsic viscosity (I.V.). Intrinsic viscosity of polypropylene, measured in decalin at 150° C., is generally between 1.0 and 6 dl./g. but may be as low as 0.5 or less and as high as 10 or more.

Polypropylene is the only stereoregular olefin polymer which has achieved substantial commercial importance to date. The present invention is particularly concerned with an improved method for producing polypropylene of higher crystallinity than normaly achievable with a particular, selected catalyst. While the advantages of the present invention may also be obtained when other alpha-olefins are similarly polymerized, the invention is of particular advantage in the production of polypropylene and will be described in terms of propylene polymerization.

As will be shown, the process of this invention permits control of propylene polymerization to increase crystallinity of the product, as indicated by insolubility in hydrocarbons, by as much as several percentage points in the range above 90%. In this range an increase of as little as one-half percentage point or even less can be very significant in providing a commercially important improvement in properties which are associated with crystallinity.

When a product has a high content of hydrocarbon soluble components, its properties associated with low hydrocarbon insolubles content can be improved, of course, by extracting the soluble portion. This commonly used expedient is, however, undesirable both because of the added expense of extraction and the relatively low commercial value of the extract. This invention is directed to a process in which the catalyst is selected and conditions are controlled such that the resulting polymer contains less than 6% hydrocarbon-soluble component and is thus in the commercially acceptable range without extraction.

This invention provides a valuable improvement in the processes for the production of stereoregular polypropylene in which solid polymer is separated from liquid hydrocarbon reaction diluent and other associated liquids by filtration or centrifuging. According to this invention, the proportion of low value hydrocarbon-soluble component which remains dissolved in the filtrate during filtration or centrifuging is decreased. The invention is of particular value in processes in which polymer is directly dried without intervening solids-liquid separation, as described, for example, in U.S. 3,040,015 to Cheney et al. In said process of Cheney et al., solid polypropylene is recovered from a slurry which contains substantially all hydrocarbon material of the reaction mixture by vaporizing the liquid components of the slurry at temperatures below the melting point of polypropylene. When such a recovery method is employed all hydrocarbon soluble material which is formed in the polymerization remains in the polymer.

It is an object of this invention to provide an improved method of producing polypropylene of a controlled high degree of crystallinity. It is a specific object to provide a method for increasing the crystallinity of polypropylene produced with highly purified reaction mixture components and with a catalyst which results from combining an active form of titanium trichloride and an aluminum dialkyl halide. Other objects of this invention will appear from the following description thereof.

Briefly stated, this invention provides a method for polymerizing an alpha-monoolefin, capable of forming a crystalline steroregular polymer, in a liquid reaction mixture to which are added as essential catalytic ingredients a catalytically active form of titanium trihalide and an aluminum dialkyl monohalide, in which the crystallinity of the resulting polymer is controlled to a desired high value by contacting the catalyst with minute predetermined controlled amounts of water and of one of certain selected amines. The range of concentration of water is generally between 0.02 and 1.0 mole of water per mole of aluminum dialykl halide, sufficient to react with only part of said alumnium dialkyl halide, and that of amine is generally between 0.005 and 0.5 per mole of aluminum dialykl halide, and preferably between 0.01 and 0.2 mole per mole; the ratio may vary with the ratio of aluminum dialkyl chloride to titanium halide being used and with the specific catalytic activity of the titanium halide.

In a preferred mode of practicing this invention, proplyene is polymerized at a temperature in the range from 0° to 120° C. in a liquid reaction mixture which comprises a non-reactive hydrocarbon diluent and, as essential catalytic ingredients, the product of admixing a catalytically active form of titanium trichloride, aluminum diethyl chloride and controlled amounts of water and of triethylamine, the amounts of water and amine being within the above-mentioned ranges at predetermined values which are effective to modify the catalytic properties of the reaction mixture in such a fashion that the resulting polypropylene has a crystallinity, characterized by insolubility in isopentane, which is higher than that obtained by similarly adding at otherwise identical reaction conditions either substantially lower or substantially higher proportions of water and amine, or either of these additives without the other. In other modes of practicing the invention, other dialkyl alumnium halides and other amines are substituted for the diethyl aluminum chloride and triethyl amine. Suitable compounds are set out hereinafter.

In a large number of runs carried out prior to this invention it was found that titanium trihalide-aluminum dialkyl halide catalysts are capable of polymerizing propylene to a product containing a very high proportion of material insoluble in isopentane. It was also found, however, that the proportion of polymer insoluble in isopentane could vary by as much as 5% or more (basic total polymer) even though no deliberate change had been made in reaction conditions or catalyst composition.

It has been generally taught that water is a harmful ingredient in propylene polymerization mixtures and that it should therefore be removed from all feedstocks, solvents and other reaction components. Among other measures to overcome the above-mentioned difficulty in reproducibility of polymer structure, steps were therefore taken to provide extremely careful control of the amount of water present in the components entering the reaction mixtures. It was unexpectedly found that in highly purified and extremely dry reaction systems in which the amount of water in the combined ingredients of the total reaction mixture was as low as 0.2 part per million or less, polypropylene of substantially lower crystallinity was generally produced than had been produced in earlier, less completely purified systems. In further careful studies it was subsequently developed that the best polymer crystallinities are obtained when the amount of water which contacts the aluminum alkyl halide component of the catalysts of this invention is a controlled amount in a predetermined narrow range between 0.02 and 1.0 mole per mole of aluminum dialkyl halide. For any given temperature in the range between 40° and 80° C. the critical range of water concentration is still narrower, the difference between the upper and lower limit of the most effective range being generally less than 0.1 mole per mole aluminum dialkyl halide when water is added to the combined reaction mixture. It was found that when less than the required small, critical amount of water is present, the resulting polymer has an undesirably low crystallinity. When the amount of water present is excessive, this not only has the adverse effect of reducing the crystallinity of the polymer but it substantially reduces the reaction rate and ultimately kills the reaction entirely. The reaction product of aluminum dialkyl halide and water which acts to provide the superior crystallinity of polymer appears to be an intermediate, fugitive product which, upon prolonged standing, is converted to a catalytically inactive form. Hence the preference for adding the controlled amount of water directly to the reaction mixture.

Although addition of water was found to result in satisfactory improvements in polymer structure, it was nevertheless desired to develop a process in which water addition could be avoided. Prior workers in the art had reported that polymerization of olefins by contact with Ziegler-type catalysts can be modified by the addition of amines. Among the somewhat conflicting reports of observed effects due to amine addition, increases in polymer crystallinity had been reported in some cases.

Accordingly, experiments were made in which an amine was added to the anhydrous reaction system. It was, indeed, found that use of triethylamine in controlled small amounts, with a $TiCl_3$-$AlEt_2Cl$ catalyst in an anhydrous system, could result in production of polypropylene of reduced isopentane solubles, i.e., of improved crystallinity. However, the best crystallinity obtainable by controlled addition of triethylamine was found to be less than the best obtainable by controlled water addition.

When either water or an effective amine is added alone in progressively increasing amounts, it is found that the content of hydrocarbon-soluble components of the polymer goes through a minimum at a point which is the function of various reaction conditions. It has now been unexpectedly found that polypropylene produced when optimum amounts of both water and a selected amine are employed has a higher crystallinity than can be achieved either by controlled addition of water without amine or by controlled addition of amine without water at otherwise identical conditions.

While this invention is particularly directed to the production of homopolymers of propylene of high crystallinity, having an isopentane solubles content below about 5%, it is also applicable to the production of improved block copolymers consisting predominantly of polypropylene, e.g., to the extent of 90%, which are produced with the above-described catalysts under conditions in which a large proportion of the reaction is carried out with only proplylene feed. The advantages of the present invention may also accrue when the same catalysts are employed in the polymerization of higher alpha-monoolefins which are known to produce crystallizable stereoregular polymers, e.g., butene-1, 3-methylpentene-1, 4-methylpentene-1, and the like.

The catalysts employed in the process of this invention are the products of combining in a hydrocarbon medium one or more of certain amines, a catalytically active form of titanium trichloride, and a suitable aluminum dialkyl halide modified with a small, controlled amount of water.

The catalytically active form of titanium trichloride is preferably produced by reducing titanium tetrachloride by contact with an aluminum alkyl, which may be an aluminum trialkyl compound or an aluminum dialkyl halide, in the required stoichiometric amount to reduce the titanium tetrachloride to titanium trichloride. It is described in some detail, for example, in U.S. Patent 2,971,925 to Winkler et al. The resulting form of titanium trichloride, depending on the conditions under which the reduction is carried out, is either brown or purple in color; it may be the form generally known as beta-TiCl₃ or that generally known as gamma-TiCl₃, complexed with aluminum and chloride ions. Such complexes may be referred to as titanium trichloride-aluminum chloride complexes. They do not necessarily contain the metals in integral mole ratios. Active titanium trichloride-aluminum chloride complex can also be produced by reducing titanium tetrachloride by contact with a reducing metal such as aluminum.

The titanium trichloride is preferably employed in concentrations ranging from 25 p.p.m. to 1000 p.p.m. Useful results are also obtained in the broader range from 5 p.p.m. to 1%. Parts and percentages are by weight, based on the total reaction mixture, including diluent.

The preferred aluminum dialkyl halide used in this invention is aluminum diethyl monochloride. Other dialkyl halides, in which the alkyl groups have from 3 to 6 or more carbon atoms and preferably are propyl, isopropyl or isobutyl, may also be employed. While chlorine is the preferred halogen, the bromide or iodide may also be employed.

Useful molecular proportions of aluminum dialkyl halide to active titanium trichloride in the catalysts of this invention are in the range from 1:1 to 5:1. Use of higher proportions of aluminum dialkyl halides is not disadvantageous but provides no further advantages. Ratios from 2:1 to 3:1 are preferred.

The time during which the aluminum dialkyl halide component of the catalyst is in contact with water prior to contact with titanium trihalide is held below about 10 minutes and is preferably no more than about 1 minute and most preferably 0 to 15 seconds. The time of 0 to 15 seconds encompasses the most preferred case, in which water is added separately to the polymerization reaction zone which contains the total reaction mixture, including all catalyst components, as hereinafter described in greater detail. It should be understood that in the above description of the invention the amount of aluminum dialkyl halide referred to is the total charged to the reactor. As explained below, it is theorized that the preferred modification of aluminum alkyl halide, resulting from contact of water and aluminum dialkyl halide as charged to the process, is a fugitive intermediate, completely formed within 15 to 150 seconds of initial contact of aluminum alkyl halide and water, and disappearing at a somewhat slower rate.

The conditions under which the reaction takes place are conventional for the polymerization of propylene or other alpha-monoolefins with titanium trihalide-aluminum dialkyl halide catalysts. The pressure is generaly between atmospheric and 500 p.s.i. It is in part a function of the temperature and of the solvent employed. The temperature is, in order of increasing preference, in the range from 0 to 120° C., from 20° to 100° C. and from 40° to 80° C. At the lower temperatures in these ranges, product of higher crystallinity is produced but the reaction rate is relatively lower. In selecting a reaction temperature, a compromise is struck between these two effects.

The polymerization reaction is carried out in liquid phase in an agitated system in which catalyst and polymer product are present in suspension as finely divided particles. It is generally preferred to dilute the monomer with an inert liquid in which it is soluble, but in which the polymer is insoluble. Suitable diluents are saturated aliphatic hydrocarbons preferably having 3 or more carbon atoms per molecule, e.g., propane, butane, petroleum ether, pentanes, hexanes, heptanes, octanes, or other gasoline boiling range hydrocarbons, or relatively aromatics-free kerosene fractions. Light paraffinic hydrocarbon diluents, boiling below about 150° C., and preferably below 50° C., at the pressure prevailing in the drying system are used when direct evaporative drying is employed.

Propylene additions, reaction conditions, and slurry withdrawal are suitably correlated to maintain in the reaction mixture at least 5% unreacted monomer and between 5 and 35% polymer. Heat of reaction is removed, suitably by direct cooling, e.g., evaporation of light components of the reaction mixture.

Compounds which modify the action of the catalyst, particularly for the purpose of molecular weight control, may be present in the reaction mixture. For example, hydrogen may be added to limit the molecular weight of the polymer. The functions and methods of use of such modifiers are known.

The process is conducted in an inert atmosphere. This is preferably accomplished by first sweeping out the reaction zone with an inert fluid, e.g., an inert gas such as nitrogen, methane or the like. This may be followed by a portion of the hydrocarbon diluent to be employed, suitably containing some aluminum alkyl compound for the purpose of removing traces of remaining moisture.

In order to maintain controllability it is essential for successful operation of the process that the reaction vessel and all the components of the reaction mixture be carefully dried and precautions maintained during the reaction to prevent any moisture from entering the reaction mixture in uncontrolled fashion. All the components of the reaction mixture must be sufficiently dry so that the total amount of moisture in all components which reaches the reactor, exclusive of deliberately added water, is accurately known and less than the amount required for control of catalyst properties. Preferably the feeds are dried so that they contain less than 0.5 and most preferably no more than 0.2 p.p.m. of water. It is important to use extremely effective drying methods, such as, for example, distillation, or contact with alumina, calcium hydride, aluminum alkyl, molecular sieves, sodium, or the like or combinations of such drying methods, to reduce the water content of all reactant and diluent streams which enter the reaction mixture.

It is equally important that all other impurities be reduced to very low concentrations. For example, it is desirable that the ingredients of the reaction mixture, as charged, contain a total of less than 1 p.p.m. of sulfur (sulfur may be present in the form of $H_2S$, COS, and organic compounds such as mercaptans, thioethers, alkyl disulfides and the like), less than 10 p.p.m. of acetylenic compounds, less than 1 p.p.m. of organically combined oxygen, and less than 10 p.p.m. of free oxygen.

The amount of water which is employed to achieve the results of this invention is in the range from 0.2 to 1 mole of water per mole of aluminum dialkyl halide ($AlR_2X$). Best results are obtained at the preferred reaction conditions with 0.09 to 0.3 mole of water per mole of $AlR_2X$. The amount of water is correlated with the temperature maintained in the reactor, amounts in the higher part of the stated range being employed at the higher temperatures in the range, with the time of contact of water and $AlR_2X$ prior to contact of the product with titanium trichloride, as illustrated below, and with the amount of amine added.

The amount of water used according to this invention, as expressed in relation to the total reaction mixture, is usually in the range between 2 and 10 parts per million, i.e., between 0.0002 and 0.001% by weight, when the preferred catalyst concentrations are employed. Thus, the reaction mixture is still substantially anhydrous even with the maximum tolerable amount of water present.

Triethylamine is particularly preferred as the amine for use according to this invention. However, certain other alkylamines and heterocyclic amines may also be successfully used.

The suitable amines consist of the following groups: (1) aliphatic tertiary amines having at least 5 carbon atoms per molecule and preferably having from 5 to 20 carbon atoms per molecule; (2) aliphatic secondary amines having at least 5 carbon atoms per molecule and preferably having from 5 to 20 carbon atoms per molecule; (3) aliphatic primary amines having at least 4 carbon atoms per molecule and preferably having from 4 to 20 carbon atoms per molecule; and (4) heterocyclic nitrogen compounds having five- or six-membered rings and having an alkyl radical substituent on one or both carbon atoms alpha to a nitrogen atom in the ring, the alkyl radicals having a total of up to 6 carbon atoms each.

Among the secondary and tertiary aliphatic amines, all alkyl groups are usually identical but those secondary amines having two different alkyl groups and those tertiary amines having two or three different alkyl groups present are equally suitable. The alkyl groups may be branched or unbranched.

Among the heterocyclic nitrogen compounds the essential configuration is a five- or six-membered ring containing at least one nitrogen atom and having an alkyl substituent group alpha to the nitrogen atom. Typical are, for example, alpha-alkyl-pyrrole, alpha-alkyl-pyridine, alpha-alkyl-pyrazine, alkyl-sym-triazine, alpha-alkyl-quinoline, alpha-alkyl-isoquinoline, alpha-alkyl-naphthyridine as well as alpha-alpha' substituted compounds such as alpha-alpha'-dialkyl pyridine, pyrazine, isoquinoline or the like. The alkyl groups may have from 1 to 6 carbon atoms each. Methyl and ethyl substituents are particularly suitable.

The amount of amine used according to this invention is in the range from 0.005 to 0.5 mole of amine per mole of dialkyl aluminum halide. The amount of amine is correlated with the temperature maintained in the reactor, amounts in the higher part of the stated range being employed at the higher temperatures in the operable range, and with the amount of water added.

The amount of amine used according to this invention, as expressed in relation to the total reaction mixture, is usually in the range between 1 and 20 parts per million and especially between 2 and 10 parts per million when the preferred catalyst concentrations are employed.

Providing for the addition of these small amounts of water and amine as such to the total reaction mixture in a continuous or semi-continuous manner and for distribution thereof in the large reaction mass would be extremely difficult. It is, therefore, generally preferred to add water and amine to the reaction mixture by means of solutions in suitable hydrocarbon solvents. Preferably the solvent employed for water and amine addition is the same as one of the hydrocarbon components of the reaction mixture, e.g., the reaction diluent, or the diluent employed in catalyst preparation, or a portion of the olefin reactant. The concentrations of water and amine in the carrier streams are controlled to known convenient values, preferably less than the saturation values; they may be typically in the range of 100 to 500 p.p.m. of water and 100 p.p.m. to 2% of amine.

It has been found that when water is added to the stream in which aluminum alkyl halide is present, prior to the stream entering the polymerization reactor, a portion of the added water is not effective in producing the desired catalyst modification; for example, when water and aluminum alkyl are combined for about one minute before addition to the reaction mixture, about twice as much water must be added as would be required when water and aluminum alkyl halide enter the reaction mixture separately. More prolonged contact would use up further amounts of added water.

While the addition to the titanium trichloride-aluminum chloride complex of small amounts of water, e.g., below 0.01 mole per mole $TiCl_3$, can be of advantage, it is preferred to avoid contact of the $TiCl_3$ component of the catalyst with the total added controlled amount of water prior to contact of said complex with the aluminum dialkyl halide component. To obtain the benefit of this invention it is important that water as such come in contact with the aluminum dialkyl halide.

It should also be understood that water, added in accordance with this invention, generally reacts completely with ingredients of the reaction mixture and thus can no longer be identified as water in the reaction mixture or effluent by known analytical methods.

In the preferred mode of practicing this invention, an agitated reaction vessel is provided in which a reaction mixture is maintained under pressure for a sufficient length of time to polymerize propylene or other alpha-monoolefin to the desired product. A suitably diluted olefin feed is continuously fed into the reactor. Catalyst centration of active catalyst. A portion of the total reactor in amounts required to maintain the desired concontration of active catalyst. A portion of the total reaction mixture is continuously withdrawn for the removal of polymer and possible recycle of the monomer and diluent components.

The crystallinity of the product resulting from carrying out the polymerization reaction in the complete absence of water and amine, and in the presence of different controlled amounts thereof may be determined in preliminary experimental runs, or it may be determined by initiating the reaction without water and amine addition and thereafter adding water and amine at various rates, or it may be known from previous experience. In order to produce polymer of the desired high crystallinity, water and amine are suitably added during the course of the reaction by introducing into the reactor hydrocarbon streams containing known amounts of water and amine. A suitable stream containing water can be prepared by passing a slip stream of dry, treated hydrocarbon feed or diluent, together with a precisely controlled flow of water in the desired ratio, e.g., 200 parts of water per million parts of hydrocarbon, through a suitable mixing device at approximately the temperature of the polymerization reaction or at a somewhat higher temperature. It is preferred to constantly produce a stream of a fixed water concentration, substantially below the saturation value of the carrier hydrocarbon, and to control the water content in the reactor by varying the total amount of this stream which is permitted to enter the reactor. A suitable stream containing amine can be prepared by simply dissolving a known amount of the amine in a known amount of treated hydrocarbon feed or diluent. This mixture can then be fed separately to the reactor at a suitably controlled rate. Preferably the streams of controlled water and amine content are introduced directly into the reaction zone where they are quickly mixed with the total reaction mixture and maintain the desired crystallinity of the polymer product.

Although the above-described method for controlling water and amine addition is preferred for convenient operation, alternative methods may be employed. For example, the total concentration of water in one of the streams entering the reaction mixture may be carefully controlled to provide just the required amount of water, e.g., by incompletely drying the stream in question in a controlled manner or by splitting one of the streams into two portions, drying one portion completely and drying the other to a controlled water concentration sufficient to provide the required amount. Amine is then separately added either to the reactor or to the water-containing stream, suitably in solution in a hydrocarbon carrier stream. Other suitable methods of controlled water and amine addition may occur to the person skilled in the art.

Conventional methods may be employed for catalyst deactivation in the withdrawn reaction mixture, removal of catalyst residue and recovery of polymer from the reaction mixture. Typically the catalyst is deactivated and converted to water-soluble form by addition of a polar compound such as an alcohol, e.g., methanol, ethanol or isopropanol, suitably with a small amount of dry HCl. This may be followed by aqueous washes, e.g., with pure water, to remove the solubilized catalyst residues. Polymer may be separated and recovered by solids-liquid separation methods, e.g., filtration and drying, or by direct vaporization of diluent from the washed slurry, e.g., spray drying, or the method of Cheney et al., U.S. 3,040,015. Direct vaporization is carried out at temperatures below about 160° C., and suitably below 140° C. The range of 100° C. to about 140° C. is suitable.

It is not known with certainty in what manner water and amine act to modify the stereoregulating ability of the catalysts used in this invention. It is thought that water interacts with the aluminum alkyl halide component to provide a modified aluminum alkyl halide which in turn interacts with the titanium halide and thus leads to the improved products. It is believed that the following equation illustrates the over-all reaction scheme which leads to the desired modified aluminum alkyl:

(1) 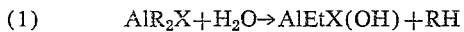  $AlR_2X + H_2O \rightarrow AlEtX(OH) + RH$

The above is believed to be a relatively rapid reaction, which is typically completed in from 15 to 150 seconds after contact of water with aluminum alkyl. When water is added to the aluminum alkyl component before it enters the reaction mixture, more time is generally available for further reaction and it is believed that the following competitive reaction then takes place more slowly and converts the desired modified aluminum alkyl into a relatively inactive form.

(2) 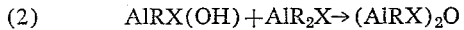  $AlRX(OH) + AlR_2X \rightarrow (AlRX)_2O$

This is believed to explain why addition of water is more effective when it is made directly to the reaction mixture than when water is added to the aluminum alkyl component.

It is thought that the desired modified aluminum alkyl, referred to above, reacts with the $TiCl_3$ to deactivate specific sites on the catalyst which, if active, would lead to production of atactic polymer components. Similarly, the amine is thought to react with certain other sites on the catalyst which would also lead to production of atactic polymer components. It is further possible that other undesired sites on the catalyst are deactivated by complex reaction products of amine and aluminum alkyl. These explanations, while unproved, are consistent with the observed fact that polymer of higher stereoregularity can be produced when both water and amine are employed than could be produced by using either the optimum amount of water or the optimum amount of amine without the other.

The invention will be further illustrated by means of the following examples. The examples are only for the purpose of illustrating the practice of this invention and the observed effects of water and amine addition, and are not to be considered a limitation of the invention.

EXAMPLE 1.—PREFERRED METHOD ILLUSTRATED

Raw feed is a mixture of propylene and paraffin hydrocarbon, saturated with water and containing less than 5 p.p.m. of sulfur, less than 10 p.p.m. of isopropyl alcohol, and negligible amounts of any other impurities known to be harmful. This mixture is dried by contact in series with two thorough drying agents, and is then treated to remove any traces of acetylenic or diolefinic substances, and to remove oxygen and any other low-boiling components. Oxygen content of the treated mixture is less than 0.01 p.p.m. Water cannot be detected in the completely purified feed by methods sensitive to 0.2 p.p.m. Sulfur concentration is below 0.1 p.p.m.

An active gamma titanium trichloride-aluminum chloride catalyst is used which is prepared by adding a solution of triethylaluminum in a paraffinic hydrocarbon to a solution of titanium tetrachloride in a stirred autoclave until a Ti/Al ratio of 0.35 is reached. The mixture is then heated to above 100° C. and held for at least 30 minutes, after which it is cooled to ambient temperature. The resulting catalyst component is essentially a slurry of particles of gamma titanium trichloride-aluminum chloride complex in paraffinic hydrocarbon. Small amounts of this slurry are injected into the reactor as needed to maintain the polymerization rate.

In order to introduce water into the reactor, a side stream of the purified feed is passed as liquid upward through a bed of ceramic Raschig rings. A water level is maintained in the bed by injection of water. The water content of the contacted sidestream is measured using a phosphorus pentoxide electrolytic cell. The wet sidestream is added to the hydrocarbon feedstream ahead of the reactor and the amount of the sidestream is adjusted to maintain 2.3 p.p.m. of water in the adjusted combined feedstream. Water content of the adjusted feed is checked by an analytical technique which is sensitive to 0.2 p.p.m.

In order to introduce amine into the system, a solution of 0.2% triethylamine is made up in treated normal butane. This solution is forced into the hydrocarbon feed stream ahead of the reactor at a controlled flow rate such that the concentration of amine in the combined feed stream is 4.3 p.p.m.

Polymerization is carried out in a continuous single-stage, well-mixed reactor at 60° C. The titanium catalyst and diethylaluminum chloride co-catalyst are added through separate lines at a rate to give a steady state slurry concentration of 14.7% by weight. The molar ratios of added water and amine to added diethyl aluminum chloride are about 0.09:1 and 0.03:1, respectively. Hydrogen is added to the reactor feed to maintain the desired molecular weight.

The slurry from the reactor is fed to a catalyst deactivating zone wherein it is contacted with isopropyl alcohol and anhydrous hydrogen chloride. Next, the slurry is mixed with water, and the water thereafter separated from the slurry. Then the liquid hydrocarbon is evaporated from the solids, leaving all hydrocarbon soluble residues with the polymer.

The recovered powder is pressed into sheets and after suitable aging its crystallinity is determined to be 69.5% by the torsion damping method described by F. E. Weir, SPE Transactions, October 1962, p. 302.

The intrinsic viscosity of the polymer, determined in decalin at 150° C., is 2.10 dl./g. The isopentane solubles value determined on the powder is 2.7% w.

EXAMPLE 2

When a given dry propylene polymerization system using $TiCl_3$-$AlEt_2Cl$ catalyst, similar to that of Example 1, is modified by adding either water or triethylamine alone in increasing amounts, it is found that the polymer crystallinity passes through a well defined maximum, i.e., the "isopentane solubles" passes through a minimum.

In a system in which polymer of 2.1 I.V. is produced by polymerization at 60° C., initial isopentane solubles content is about 7%. As water is added, in a stream separately fed to the reactor, a minimum of about 3.6% is found when between 2 and 3.5 p.p.m. water is added. Addition of about 8 p.p.m. water results in isopentane soluble of about 5%. When triethylamine was similarly added instead of water, the isopentane solubles minimum occurred when between 3 and 5 p.p.m. triethylamine was added, and was found to be about 4.3% (compared with 3.3% in the case of water addition). Isopentane solubles rose rapidly at greater amine concentrations, exceeding the 7% value (of the dry system without added water or amine) at an amine concentration of about 9 p.p.m. and rising to 18% at 20 p.p.m. amine concentration.

It was surprisingly found that combined addition of both water and amine resulted in production of polymer of higher crystallinity than could be obtained with the optimum concentration of water alone. At conditions like those of the above experiments, the combined addition of 2 p.p.m. water and 4 p.p.m. triethylamine resulted in a minimum isopentane solubles content of about 2.7%.

EXAMPLE 3.—ALTERNATIVE METHOD ILLUSTRATED

The operation described in Example 1 is repeated except that the diethylaluminum chloride co-catalyst is not added to the reactor through a separate line. Instead, it is added to the feed stream ahead of the reactor but downstream of the point where water is added. In this case the adjusted feed contains 3.7 p.p.m. water.

Polymer concentration is 12% w in the slurry leaving the reactor. Crystallinity of the product is 68.5%. Intrinsic viscosity is 2.1 dl./g., and the isopentane solubles value 2.7%.

EXAMPLE 4.—EFFECT OF WATER AND AMINE ON REACTION RATE

Although the addition of water in accordance with this invention provides a substantial benefit in improved product crystallinity, as has been illustrated, it causes a steady decline in reaction rate. No range of water concentration was found in which addition of water increased the reaction rate. Fortunately, the amount of water required to obtain the benefit of increased crystallinity is sufficiently small so that the adverse effect on reaction rate is relatively slight. Table 1 presents the relationship of reaction rate to water:aluminum alkyl ratio, as read from graphs obtained by plotting the results of a number of runs carried out in accordance with Examples 1 and 2, at 60° C.

The reaction rate constant, $k$, is determined from the epuation $k = w/cm$, where $w$ = grams polymer produced per hour
$c$ = grams titanium trichloride in polymerizer
$m$ = mole fraction propylene in polymerization liquid.

The reaction rate constant varies, at otherwise equal conditions, with the I.V. of the polymer. The values in the table are adjusted to a constant I.V. of 2.0 dl./g.

TABLE 1

| $H_2O:AlEt_2Cl$ Mol Ratio | 0.02 | 0.05 | 0.10 | 0.15 | 0.20 | 0.30 | 0.40 |
|---|---|---|---|---|---|---|---|
| Reaction Rate Constant: | | | | | | | |
| Method of Example 1 | 900 | 820 | 720 | 610 | 500 | 350 | |
| Method of Example 3 | 920 | 880 | 820 | 770 | 700 | 600 | 500 |

Triethylamine also reduces the reaction rate. When triethylamine was used in a concentration of 4 p.p.m. on feed, the reaction rate was reduced approximately 10%.

EXAMPLE 5.—EFFECT OF WATER AND AMINE ON POLYMER MOLECULAR WEIGHT

A careful statistical analysis of the results of over 20 runs carried out in dry systems without water addition and 14 runs carried out with sufficient water addition, in the range from 2 to 9 p.p.m. to obtain the benefits of this invention showed no demonstrable effect of water addition on the molecular weight of the polymer.

In each instance, the actual I.V. of the polymer was compared with the "predicted" I.V., i.e., the value calculated from known correlations based on reaction conditions such as temperature and hydrogen concentration, but not including water concentration as a variable. The average deviation of actual from predicted I.V. was −0.03 for the runs with water present and −0.06 for the runs with a dry system. Considering the degree of accuracy of determination of reaction conditions and the fact that I.V. values are rounded off to the nearest tenth, the observed differences are not significant. There was no trend toward greater deviations from prediction at greater water concentrations in the studied range.

Amine likewise produces no significant change in polymer molecular weight.

EXAMPLE 6

Repetition of Example 1 with substitution of titanium trichloride-aluminum chloride complex produced by reduction of $TiCl_4$ with aluminum metal leads to similarly good results.

EXAMPLE 7

Repetition of Example 1 with substitution of tripropylamine in a ratio of about 0.036 mole per mole aluminum diethyl chloride results in the production of polypropylene of substantially higher crystallinity than in the absence of the amine. Similarly good crystallinity is obtained with di-n-butylamine and with 2.6-lutidine, respectively, in place of said tri-n-propylamine. Some improvement in crystallinity is also obtained when in place of tri-n-propylamine there is substituted one of the following: tri-n-butylamine, di-n-heptylamine, n-butylamine, a branched primary amine of a $C_{12}$–$C_{15}$ mixture of alkanes, alpha-picoline, and alpha-ethylpyridine. No effective improvement in crystallinity is obtained, or a substantial loss of catalyst activity results, when in place of said tri-n-propylamine the following are substituted: trimethylamine, dimethyamine, ethylamine and piperidine.

In the description and examples, parts and percentages of ingredients of compositions are by weight, unless otherwise stated.

I claim as my invention:

1. A continuous process for producing highly crystalline polypropylene which comprises
    (1) preparing a reaction mixture comprising
        (a) liquid non-reactive hydrocarbon diluent,
        (b) propylene and polymer resulting from its polymerization, and
        (c) as catalyst the reaction product of between 25 p.p.m. and 1% by weight of catalytically active titanium trichloride resulting from the reduction of titanium tetrachloride with an aluminum alkyl compound or aluminum metal, an aluminum dialkyl halide, the molar ratio of Al:Ti being between about 1:1 and about 5:1, an added, controlled amount of water and an added, controlled amount of an amine selected from the group consisting of (1) aliphatic tertiary amines having at least 5 carbon atoms per molecule, (2) aliphatic secondary amines having at least 5 carbon atoms per molecule, (3) aliphatic primary amines having at least 4 carbon atoms per molecule, and (4) heterocyclic nitrogen compounds having five- to six-membered rings and having an alkyl radical substituent of up to 6 carbon atoms on at least one carbon alpha to a nitrogen atom in the ring;
    (2) maintaining said reaction mixture at a temperature range from 0° C. to 120° C.;
    (3) continuously adding to said reaction mixture additional diluent, propylene, and catalyst ingredients;
    (4) controlling the addition of water and of amine such that the total amount of water which contacts said aluminum dialkyl halide is in the range from 0.02 to 1 mole per mole of aluminum dialkyl halide and is in contact with said aluminum dialkyl halide in the absence of titanium trichloride for a time in the range from 0 to 60 seconds and the total amount of amine is in the range from 0.005 to 0.5 mole per mole of aluminum dialkyl halide, said added water and amine being effective to modify the catalytic properties of the catalyst to maintain a product crystallinity, as indicated by percent insoluble in isopentane, greater than 95% and substantially in excess of that obtained by employing a substantially higher or a substantially lower amount of water and said amine, or any amount of water or said amine separately, at otherwise identical conditions; and
    (5) continuously withdrawing a portion of said reaction mixture, deactivating catalyst therein, and recovering polymer therefrom.

2. A continuous process for producing highly crystalline polypropylene which comprises
(1) maintaining in a reaction zone a polymerization reaction mixture comprising solid polypropylene and catalyst in suspension in liquid hydrocarbon at a temperature in the range from 0° to 120° C.;
(2) continuously introducing into said reaction zone
   (a) non-reactive hydrocarbon diluent,
   (b) propylene,
   (c) catalytically active titanium trichloride resulting from the reduction of titanium tetrachloride with an aluminum trialkyl or aluminum dialkyl halide,
   (d) an aluminum dialkyl halide in which each alkyl group has from 2 to 6 carbon atoms,
   (e) a controlled amount of water, and
   (f) a controlled amount of a trialkylamine of from 5 to 20 carbon atoms per molecule;
   wherein the addition of components is controlled such that
      (i) the concentration of titanium trichloride in the reaction mixture is between about 25 p.p.m. and 1% by weight;
      (ii) the molar ratio of aluminum to titanium is between about 1:1 and about 5:1;
      (iii) the time during which said water and said aluminum dialkyl halide are in contact in the absence of titanium trichloride is in the range from 0 to 15 seconds; and
      (iv) the amounts of water and amine which enter the reaction zone are in the range from 0.02 to 0.3 mole of water and 0.01 to 0.2 mole of amine per mole of aluminum dialkyl halide added, and are controlled to modify the catalytic properties of the catalyst to maintain a product crystallinity, as indicated by percent insoluble in isopentane, greater than 95% and substantially in excess of that obtained by employing a substantially higher or a substantially lower amount of water and amine, or any amount of water or amine separately at otherwise identical reaction conditions; and
(3) continuously withdrawing a portion of reaction mixture from said reaction zone and recovering polypropylene product therefrom.

3. A continuous process for producing highly crystalline polypropylene which comprises
(1) maintaining in a reaction zone at a temperature of about 60° C. a polymerization reaction mixture consisting of solid polypropylene and catalyst in liquid hydrocarbon which boils below about 150° C.;
(2) continuously introducing into said reaction zone
   (a) paraffinic hydrocarbon diluent which boils below about 150° C.,
   (b) propylene,
   (c) catalytically active titanium chloride resulting from the reduction of titanium tetrachloride with aluminum triethyl,
   (d) aluminum diethyl chloride,
   (e) a controlled amount of water, and
   (f) a controlled amount of triethylamine,
   wherein the addition of components is controlled such that
      (i) the concentration of titanium trichloride in the reaction mixture is between about 25 p.p.m. and 1000 p.p.m.,
      (ii) the molar ratio of aluminum to titanium is between about 1:1 and 5:1,
      (iii) the time during which said water and said aluminum dialkyl halide are in contact in the absence of titanium trichloride is in the range from 0 to 15 seconds; and
      (iv) the amount of water which enters the reaction zone is controlled in the range from 0.09 to less than 0.19 mole per mole of aluminum dialkyl chloride, and that of triethylamine in the range from 0.01 to 0.2 mole per mole of aluminum dialkyl chloride, the combined amounts being such as to modify the catalytic properties of the catalyst to maintain a product crystallinity, as indicated by percent insoluble in isopentane, greater than 95% and substantially in excess of that obtained by employing a substantially higher or a substantially lower amount of water and amine, or any amount of water or amine separately, at otherwise identical reaction conditions;
(3) continuously withdrawing a portion of reaction mixture from said reaction zone;
(4) deactivating residual catalyst in said portion;
(5) removing residue of deactivated catalyst from said portion; and
(6) recovering dry polypropylene from the substantially catalyst-free mixture of solid polymer and liquid hydrocarbon by subjecting it to vaporizing conditions, including temperatures below 160° C. but sufficiently high to permit said solvent to vaporize, and separating solid from vapor.

4. A continuous process for producing highly crystalline polypropylene which comprises
(1) preparing a reaction mixture from ingredients which have been carefully dried to provide a total of less than 1 p.p.m. of water in the total mixture, said reaction mixture comprising
   (a) a liquid paraffinic hydrocarbon diluent boiling below 150° C.,
   (b) propylene and polymer resulting from its polymerization, and
   (c) as catalyst the reaction product of between 25 p.p.m. and 1 percent by weight of catalytically active titanium trichloride resulting from the reduction of titanium tetrachloride with an aluminum trialkyl or aluminum dialkyl halide, an aluminum dialkyl halide in which each alkyl group has from 2 to 6 carbon atoms, the molar ratio of Al:Ti being between 1:1 and 5:1, an added, controlled amount of water, and an added, controlled amount of an amine selected from the group consisting of (1) aliphatic tertiary amines having at least 5 carbon atoms per molecule, (2) aliphatic secondary amines having at least 5 carbon atoms per molecule, (3) aliphatic primary amines having at least 4 carbon atoms per molecule, and (4) heterocyclic nitrogen compounds having five- to six-membered rings and having an alkyl radical substituent of up to 6 carbon atoms on at least one carbon alpha to a nitrogen atom in the ring;
(2) maintaining said reaction mixture at a temperature in the range from 0° C. to 120° C.;
(3) continuously adding to said reaction mixture additionally diluent, propylene, and catalyst ingredients including carefully controlled, predetermined proportions of water and said amine, effective to modify the catalytic properties of said catalyst to maintain a product crystallinity, as indicated by percent insoluble in isopentane, greater than 95% and substantially in excess of that obtained by employing a substantially higher or a substantially lower amount of water and said amine, or any amount of water or said amine separately, at otherwise identical conditions; said proportions being in the range from 0.02 to 0.3 mole of water and 0.01 to 0.2 mole of amine per mole of aluminum dialkyl halide, and the time during which said water is in contact with said aluminum dialkyl halide in the absence of titanium trichloride being in the range from 0 to 15 seconds; and (4) continuously withdrawing a portion of said reaction mixture, deactivating catalyst therein, and recovering polymer therefrom.

5. A process according to claim 4, wherein water is dissolved in the concentration of about 200 p.p.m. in a hydrocarbon stream and a controlled portions of said stream is continuously added to said reaction mixture to provide said predetermined proportion of water therein.

6. A process according to claim 4, wherein said diluent boils below 50° C., and polymer is separated from reaction mixture by direct vaporization at a temperature below 140° C.

References Cited by the Examiner

UNITED STATES PATENTS

| | | | |
|---|---|---|---|
| 3,139,418 | 6/1964 | Marullo | 260—93.7 |
| 3,155,626 | 11/1964 | Boor | 252—429 |
| 3,189,591 | 6/1965 | Serra | 260—93.7 |
| 3,207,740 | 9/1965 | Cheney | 260—93.7 |

JOSEPH L. SCHOFER, *Primary Examiner.*

JAMES A. SEIDLECK, *Examiner.*

M. B. KURTZMAN, *Assistant Examiner.*